INVENTOR
GEORGE B. KARNOFSKY

By
Attorneys

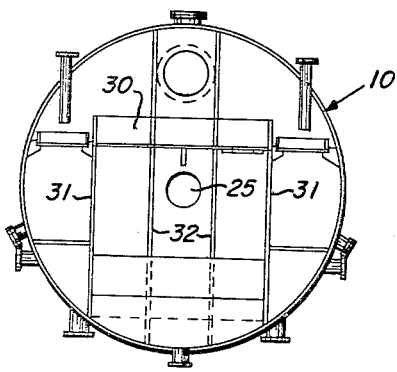
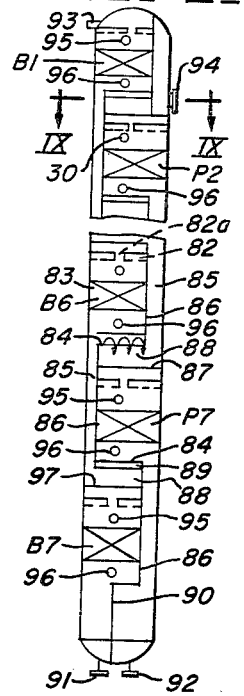
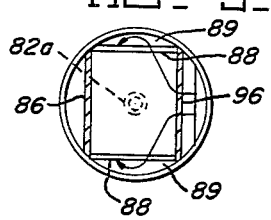
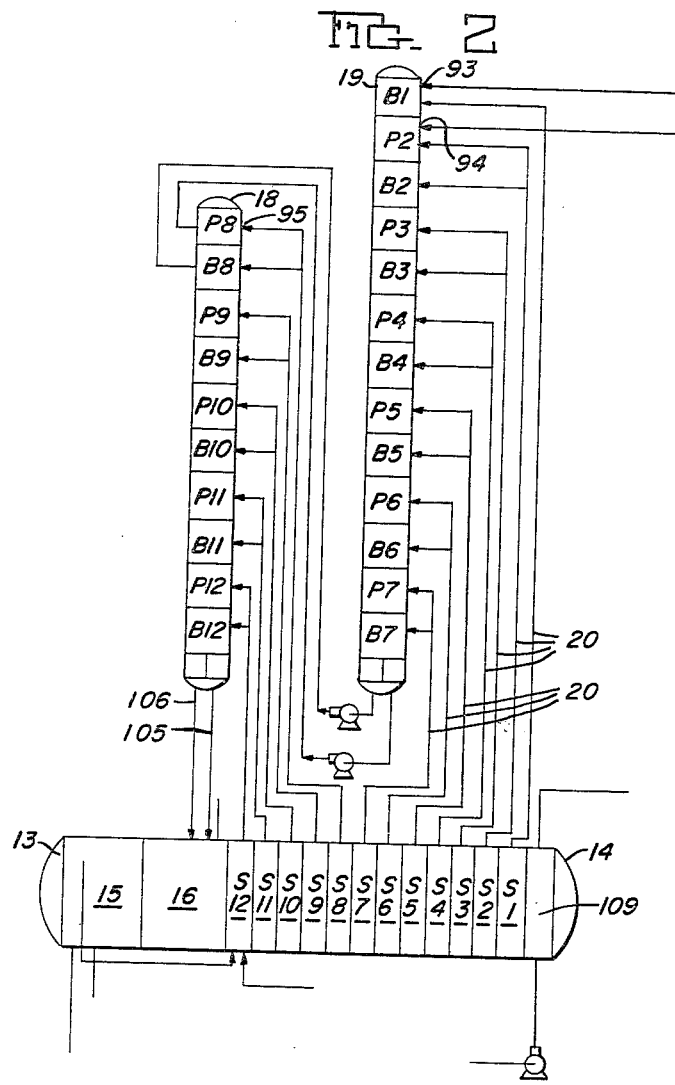
INVENTOR
GEORGE B. KARNOFSKY
Attorneys

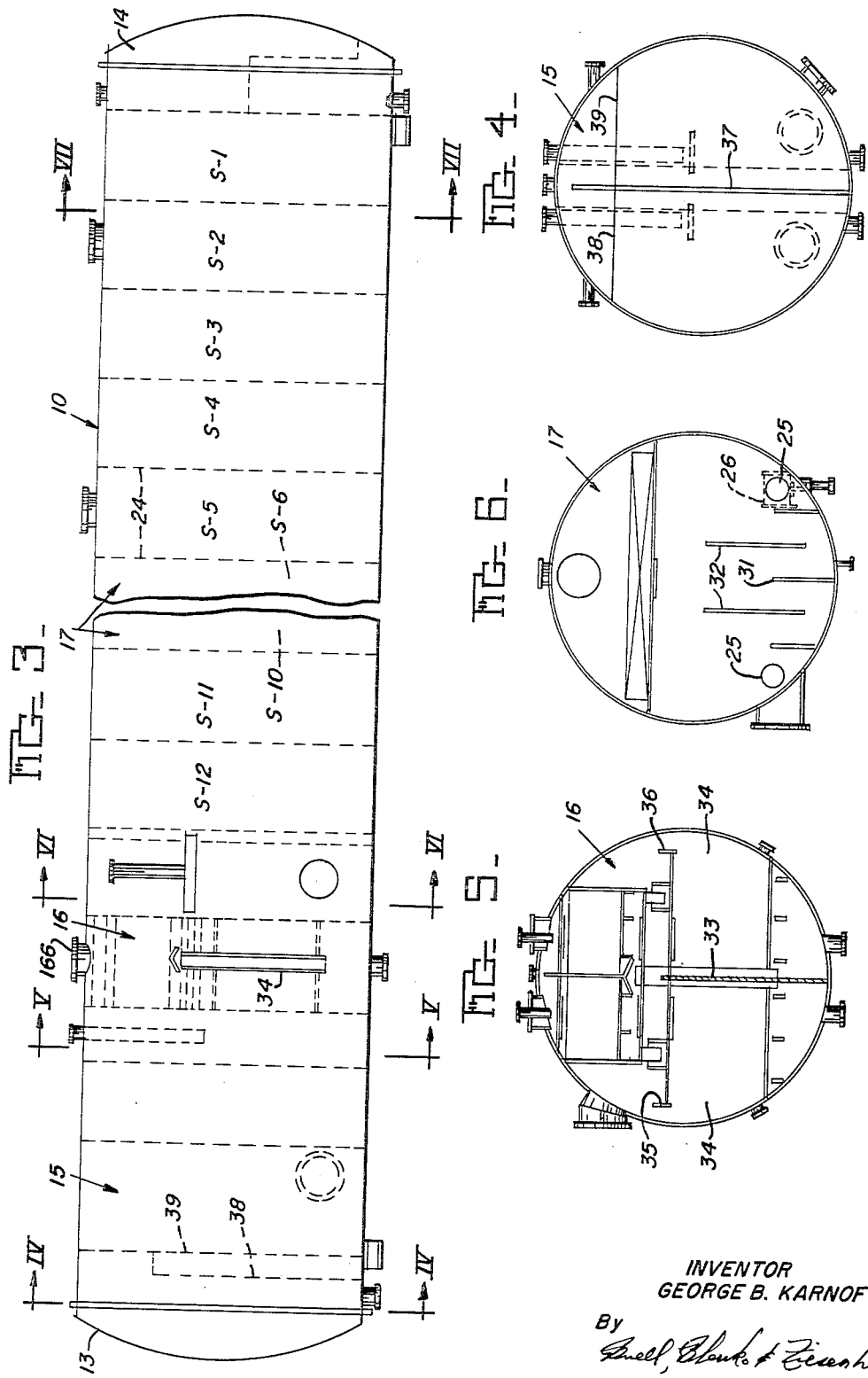

United States Patent Office 3,486,346
Patented Dec. 30, 1969

3,486,346
HEAT INTERCHANGE APPARATUS FOR SALINE LIQUID CONVERSION SYSTEMS
George B. Karnofsky, Mount Lebanon, Pa., assignor to Blaw-Knox Company, Pittsburgh, Pa., a corporation of Delaware
Filed July 11, 1968, Ser. No. 744,032
Int. Cl. C02b 1/00; F28f 9/22; F28d 7/00
U.S. Cl. 62—123                                          12 Claims

ABSTRACT OF THE DISCLOSURE

A heat interchange apparatus is provided for saline liquid conversion systems including an elongated tank divided internally to form intercommunicating stage compartments each adapted for intimate contact between saline liquid and vaporizing refrigerant, at least one vertical vessel divided internally by plate members into downwardly communicating first cells and second cells, inlet means receiving brine in the uppermost first cell, second inlet means receiving product water in the uppermost second cell, means connecting one each of the compartments with a first and second cell for passing vaporized refrigerant therebetween and providing intimate contact for condensing refrigerant on brine and product water.

---

This invention relates to heat interchange apparatus for a saline liquid conversion system, and more particularly to heat interchange apparatus for cooling feed saline liquid by vaporization of a refrigerant liquid mixed therewith and for condensing the vaporized refrigerant by contacting it with product water and product brine.

The use of heat interchange apparatus for saline liquid conversion systems such as sea water conversion systems is not unique with this invention. Such systems have been disclosed in my Patent 3,170,779 and Wiegandt Patent 3,251,193; and heat interchangers have been specifically the subject matter of considerable development as illustrated in Norwegian Patent 70,507, dated June 3, 1946; Lewis et al. Patent 2,749,094; Colton Patent 3,207,677 and Herman Patent 3,167,401. More recently I disclosed a form of heat exchanger in such a saline water conversion system in my co-pending application Ser. No. 567,201, filed July 22, 1966. The heat interchanger in my copending application includes a decanting section, a refrigerant condensing section, and a saline liquid cooling section. Saline liquid is cooled in a central compartment-divided passage by evaporation of refrigerant mixed with the saline liquid. Vaporized refrigerant from each compartment passes out of the central passage into adjacent corresponding side compartments where it encounters product water and brine, on which it condenses. The product water and brine are pumped from one of the cells of the side passage to a next adjacent upstream cell in a direction countercurrent to the flow of said saline fluid. Accordingly, a large bank of pumps is required. These pumps necessarily require a substantial amount of electric power and add considerably to the operating expense of a saline liquid conversion plant.

The prior art practices suffered from various deficiences including large power requirements and difficulty in isolating the various phases of the system to attain the maximum efficiency.

My invention provides a saline water freeze conversion plant comprising four major components of unique construction, designed to combine particular equipment requirements of the various process steps in a new way such that the entire system is fully provided in a thermodynamically economical manner at a low capital cost. Two of these components are horizontal cylindrical vessels and one or more vertical towers which together comprise a refrigerant condenser and heat interchanger which receives product water and brine on the one hand and sea water mixed with refrigerant on the other hand, and cool the sea water by heat exchange with said product water and brine.

Preferably, the refrigerant condenser and heat interchanger include a condenser and decanter for the liquid refrigerant as well as the heat interchanger portions. The other major plant components are a cylindrical freezer and refrigerant storage tank in which liquid refrigerant is contacted with sea water to produce ice and refrigerant vapor and a generally cylindrical melter-washer and storage vessel, which are more particularly disclosed and claimed in my copending application Ser. No. 567,201 previously referred to.

In the process employing the apparatus of this invention, potable water is made from sea water or brackish water by partial freezing employing an immiscible vaporizable refrigerant such as normal butane. Ice slurry is produced in a freezer by direct contact of saline water with refrigerant liquid, which is vaporized. The resulting slurry of ice in brine is sent to a washer, where the ice is washed substantially free of salt, using part of the melted ice as the wash liquid. Washed ice then passes to a melter, where it is brought into direct contact with slightly compressed refrigerant vapor from the freezer. Refrigerant vapor condenses as it melts the ice, and the condensate is recycled to the freezer. This system employs four major elements: a freezer, a washer, a melter and a primary compressor. Norwegian Patent No. 70,507, issued June 3, 1946, is cited as a general disclosure of such systems. It is essential that there also be a heat interchanger between the incoming saline water and the product brine and potable water in order to recover the cold from the products into the incoming feed. Since the system operates below ambient temperature, and since heats of compression and heat in the feed salt water must be removed, there is required also an auxiliary refrigeration system, which comprises conveniently a secondary compressor, by which refrigerant vapor not condensed in the melter is compressed to a pressure at which it can be condensed by cooling water. Also there is of necessity an auxiliary system for stripping product brine and potable water of their residual refrigerant content, and also an auxiliary system for recovering refrigerant from non-condensible gases that are vented.

In a preferred embodiment of my invention, I provide a saline water freeze conversion apparatus in which the organization is such that there are required only four major vessels of unique construction. The four major vessels are designed to combine particular equipment requirements of the various process steps in a new way such that the entire system is fully provided in a thermodynamically economical manner at a low capital cost. In such embodiment, I provide a horizontal cylindrical vessel and one or more vertical towers which together comprise a refrigerant condenser and heat interchanger receiving product water and brine on the one hand and sea water mixed with refrigerant on the other hand, and cooling sea water by heat exchange with said product water and brine, a cylindrical freezer and refrigerant storage tank in which liquid refrigerant is contacted with sea water to produce ice and refrigerant vapor and a generally cylindrical melter-washer and storage vessel. The refrigerant condenser and heat interchanger include a condenser and decanter for the liquid refrigerant as well as the heat interchanger portions.

Preferably I provide a heat interchanger which comprises an elongated generally horizontal tank for cooling saline liquid divided internally by walls to form intercommunicating storage compartments, each of the compartments adapted for intimate contact between saline liquid and vaporizing refrigerant liquid, means communicating with each of the compartments for discharging vaporized refrigerant, at least one elongated upstanding vessel divided internally by plate members into downwardly communicating first cells and downwardly communicating second cells separate from the first cells, first inlet means at an upper portion of the vessel for receiving product brine in the uppermost first cell, second inlet means at an upper portion of the vessel for receiving product water in the uppermost second cell, means connecting one each of the compartments with one each of the first and second cells, respectively, for passing vaporized refrigerant therebetween, and each of the first cells adapted for intimate contact between product brine and vaporized refrigerant, and each of the second cells adapted for intimate contact between product water and vaporized refrigerant.

In the foregoing general statement of my invention, I have set out certain objects, purposes and advantages of my invention. Other objects, purposes and advantages of this invention will be apparent from a consideration of the following description and the accompanying drawings in which:

FIGURE 2 is an elevation diagram of a condenser and heat interchange apparatus according to my invention;

FIGURE 3 is an enlarged side elevation of the decanting, secondary refrigerant condensing and brine saline water cooling portions of the heat interchanger of FIGURES 1 and 2;

FIGURE 4 is a section of the line IV—IV of FIGURE 3;

FIGURE 5 is a section on the line V—V of FIGURE 3;

FIGURE 6 is a section on the line VI—VI of FIGURE 3;

FIGURE 7 is a section on the line VII—VII of FIGURE 3;

FIGURE 8 is a vertical section, partly broken away of either tower of FIGURE 2; and FIGURE 9 is a section on line IX—IX of FIGURE 8.

Figure 1:
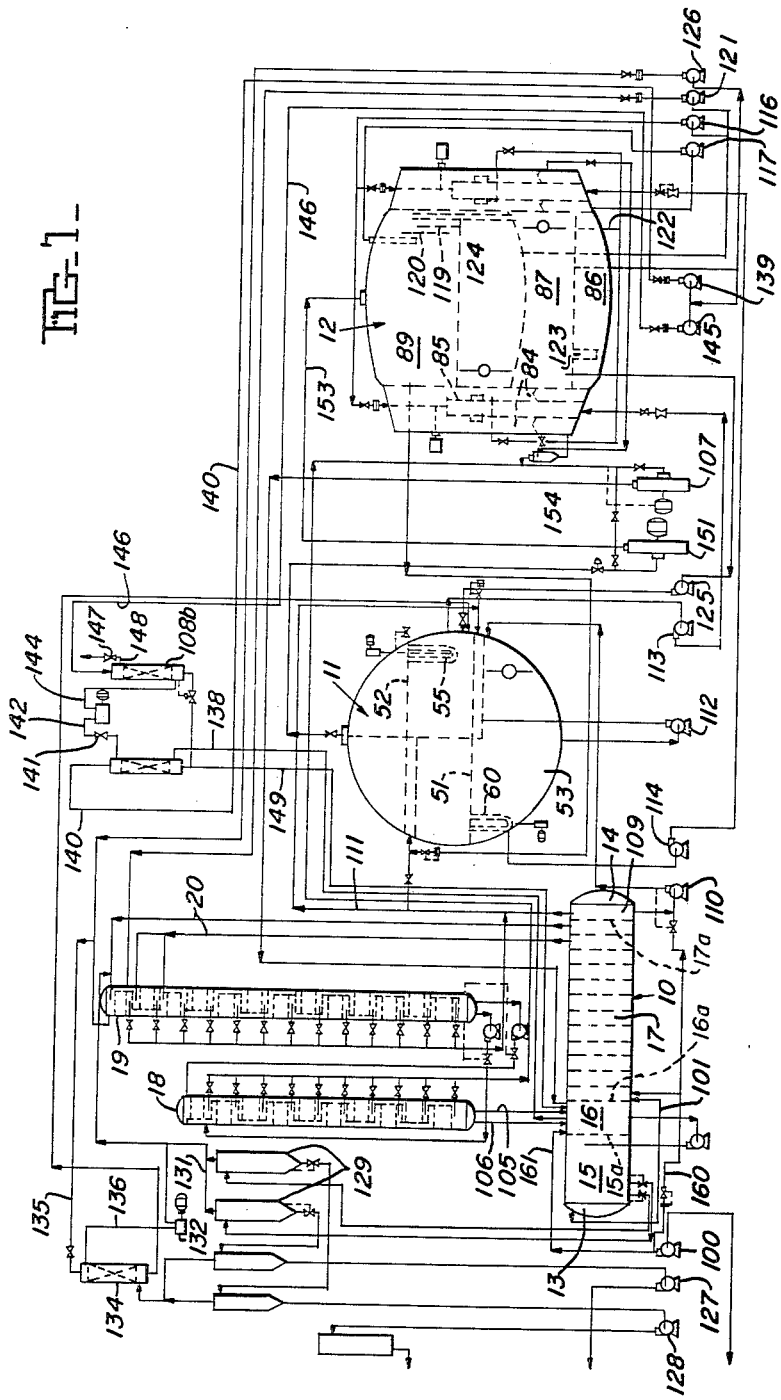
FIGURE 1 is a schematic flow diagram in elevation of a process employing my invention.

Referring to FIGURE 1, I have illustrated diagrammatically the elements of equipment for the process previously referred to. There is a freezer, more specifically designated as the freezer and refrigerant storage vessel 11; there are an ice washer and a melter, specifically designated as the washer-ice melter 12. There is a primary compressor 151 which compresses refrigerant vapor generated at the freezer 11 so that the vapor can condense in the melter. There is an auxiliary refrigeration compressor, designated as the secondary compressor 107 which compresses refrigerant vapor not condensed in the melter so that it can condense in the direct contact condenser which is part of the vessel designated as the refrigerant condenser and heat interchanger 10. The particular construction and operation of these basic elements is described in my co-pending application Ser. No. 567,201 and will not be dealt with in detail here. The vessel 10 also includes means for generating refrigerant vapor in successive stages at decreasing pressure by flashing refrigerant from warm feed sea water. This vapor is condensed in corresponding stages of heat interchange towers 18 and 19 by direct contact with existing product brine and product water.

The refrigerant condenser and heat exchanger 10 is in the form of a cylindrical tank closed at each end by end bells 13 and 14. The condenser and heat exchanger is divided lengthwise by divider plates 15a, 16a and 17a into three general areas: decanter section 15, condenser section 16 and a sea water cooling section 17. The sea water cooling section 17 is a continuous passage 21 formed by lateral vertical dividers 24, as is shown in FIGURE 3. Each of the walls 24 is provided with a passage opening 25 alternately at opposite sides of the vessel 10 having a slide valve 26 operated by a hydraulic cylinder or by manual adjustment. The compartments formed by the dividers 24 are designated as S–1 through S–12. A demister 30 is provided in the vapor space of each compartment. Longitudinal baffles 31, 32 are paired in each compartment to cause mixing of the saline water with refrigerant and therefore better heat exchange contact.

The condenser section 16 is divided lengthwise by a wall 33 and is subdivided by a transverse wall 34 into four cells connected in pairs by opening 34a in 34. Distributor trays 35 and 36 are provided above the cells parallel to longitudinal wall 33. The decanter section 15 is divided by a longitudinal wall or baffle 37 extending the full length thereof. Two transverse baffles 38 and 39 at the end adjacent to bell 13 aid in maintaining a proper interface level and provide a seal for the decanting section and a weir for the decanting function.

The heat exchange towers 18 and 19 are shown schematically in FIGURE 1, as part of the entire process for making potable water. For clarity, most of the vapor lines 20 connecting butane vaporizing stages of the vessel 10 with the corresponding condensing stages in the towers 18 and 19 are omitted in FIGURE 1. They are all shown in FIGURE 2. Details of tower 18 are shown in FIGURES 8 and 9; the construction of towers 18 and 19 is essentially identical.

Two heat exchange towers, as shown, are a matter of choice; one, or more than two towers may be used. Flow of product water and brine is in series from tower to tower, the flows being advanced as illustrated by pumps 80 and 81. The towers are divided into pairs of stages P–2, B–2; P–3, B–3; . . . P–12, B–12, each connected by a vapor pipe to the corresponding stage, designated respectively as S–2, S–3 . . . S–12, in the heat exchange section of vessel 10. The stage at the top of tower 19 is a single stage B–1 connected to the corresponding stage S–1 in vessel 10. Product brine enters tower 19 through stage B–1, flows by gravity in succession through stages B–1, B–2 . . . B–7, then is picked up by pump 80 and pumped to the top of tower 18 through stages B–8, B–9 . . . B–12, then exits to the condenser section 16 of vessel 10. Likewise, product water enters tower 19 through stage P–2, flows through the successive stages by gravity to pump 81 by which it is pumped to the top of tower 18 and flows by gravity through the successive stages, and exits to the condenser section 16 of vessel 10.

FIGURE 8 shows sectional elevations of the top and bottom of tower 18. It shows the construction of stages B–1, P–2, B–6, P–7 and B–7. Each stage starts at the top with a horizontal perforated diaphragm 82 designed to distribute liquid to the packing 83. The diaphragm 82 extends across the entire area of the tower except for one segment. The diaphragm is vented by stand pipe 82a, opened at top and bottom so as to form a passage between the vapor spaces above and below the diaphragm. Liquid drains from the packing onto the horizontal solid plate 84, which extends across the entire area of the tower except for two opposed segments. Liquid runs off the plate 84 into the segmental downcomer 85 formed by the vertical plate 86. The plate 86 extends above the horizontal solid plate 87, which extends over the entire area of the tower except for three segments formed by intersection with one downcomer plate 86 and two vertical plates 88. The receptacle formed by plate 87, the downcomer plate 86 and two plates 88, is the seal cup. Liquid flows from the seal cup over the tops of plate 88, which stops short of the plate 84 to leave the vapor openings 89. Below stage B–7 the two liquid flows are kept segregated in the bottom by vertical divider 90. Brine and product water exit the tower by nozzles 91 and 92 respectively. Brine and product water enter the tower by nozzles 93 and 94 respectively. Refrigerant vapor enters each stage by a nozzle 95. Each stage is vented by a nozzle 96.

Operation of the apparatus of this invention is as follows. When start-up has been completed and the system is in normal operation, saline water is pumped by pump 100 into passages 21 of the refrigerant condenser and heat exchanger unit 10. Liquid refrigerant is introduced into the saline water in passage 21 through line 101 from decanter section 15. Heat is transferred from the saline water stream in the several stage compartments of passage 21 to the brine and product water streams in towers 18 and 19 by employing vaporizing and condensing refrigerant as an intermediate heat transfer medium. Liquid refrigerant entering passage 21 is evaporated by direct contact with the sea water, extracting heat therefrom in the form of heat of vaporization of the refrigerant. This occurs stage by stage in the several compartments into which passage 21 is broken and through which the sea water and liquid refrigerant both flow. The pressure in the compartments is successively lower in the direction of sea water flow. Refrigerant vapor from each compartment passes upwardly through an entrainment separator, demister 30, and then through the vapor lines 20 to the corresponding stages in towers 18 and 19 where it is contacted by cold product liquids to which the refrigerant vapor gives up its heat of vaporization as it is condensed in concurrent flow with the liquid within the stage. The method of heat exchange involved, namely the stage-by-stage evaporation of a vaporizable fluid directly from the liquid stream being cooled and condensing the fluid directly in the liquid stream being warmed is disclosed in Lewis et al. Patent 2,749,094 issued June 5, 1956, entitled Method of Heat Exchange Between Liquids, and is not per se my invention. Liquid flow from stage to stage within the towers is by gravity, the pressure increasing stepwise in the direction of flow. The product water and the brine flow from the condensing tower 18 through pipes 105 and 106, respectively, to the condenser section where they are contacted with refrigerant vapor from the secondary compressor 107.

The above described heat interchanger may be comprised of twelve stages, as shown, or more or less stages, depending on the extent of heat exchange desired. Pressure decreases in the direction of saline water flow along passage 21 to the flash chamber 109. The pressure in each stage adjusts itself, provided that vapor leakage between stages is prevented by maintaining liquid seals between the compartments of the passage 21 with the orifices 25 and between the successive stages of the towers 18 and 19 with the downcomers 85 and the seal cups, and provided that inert gases are vented from the condensing stages through the nozzles 96. The pressures, using normal butane as the refrigerant, would thus decrease from stage to stage from about 30 p.s.i.g. at the saline water feed end to somewhat over 600 mm. Hg absolute at the flash chamber 109 (which vents to the freezer at 600 mm. Hg absolute).

The minimum height of a stage such as B–6 in tower 19 will be determined by the requirement that the height of the downcomer 85 must be sufficient to maintain the required pressure difference between stages without loss of liquid seal at the seal cup. Although the major portion of the liquid flowing through the downcomers is water or brine, the rest being refrigerant, it is prudent where the refrigerant is a hydrocarbon to design on the basis that the seal will be maintained by liquid hydrocarbon. Thus, for the exchanger of twelve stages used here for illustration, the temperature difference between stages will be about 5° F., corresponding at the cold end of the exchanger to 6 feet of head of liquid butane (the increase in vapor pressure of butane between 25° F. and 30° F.) and at the warm end to 11 feet of head of liquid butane (the increase in vapor pressure of butane between 70° F. and 75° F.). Since the minimum practical height per stage that may be expected to house the packing 85, the seal cup, the distributor 82 and the intervening vapor spaces is about 8 feet, it can be seen that the height of the tower 19, comprising 7½ pairs of stages, will be at least 110 feet. Likewise, the height of the tower 18, comprising 5 pairs of stages whose stage spacing is set at greater than 8 feet by the butane vapor pressure increase, will be at least 110 feet. The distribution of the stages between two towers is arbitrary, to minimize overall height. Three or more towers may be used to advantage to optimize total cost. Because the brine is colder than the product water, one or more heat exchange stages are required at the cold end of the exchanger for brine in addition to those required for product water. It is convenient to add one unpaired brine warming brine stage B–1 at the top of tower 19, without any penalty of tower height. If more than one additional brine warming stage is desired, the additional stages may preferably be of the type revealed in my pending application No. 567,201 filed July 22, 1966, wherein the refrigerant vapor is condensed within the tank 10 in compartments between compartment S–1 and flash chamber 109.

Refrigerant vapor is delivered to the condenser section 16 from secondary compressor 107 as shown in FIGURE 1 and is condensed with the product water and brine from the heat interchanger tower 18. The condenser section 16 is vented to the low pressure vent scrubber 108a. In the four-cell condenser section 16 illustrated in FIGURE 3, refrigerant vapor enters one pair of cells through the common inlet nozzle 16b at the top, and passes concurrently with the cold condensing liquid through packing below the distributor trays 35 and 36, and any remaining uncondensed vapor thence passes through the opening 34a into the other pair of cells, and passes upward into or through the packing countercurrent to the cold condensing liquid from distributor trays 35 and 36. Non-condensible vapor and gas leave the condenser section 16 through nozzle 16c, which is connected to the vent scrubber 108a. Liquid refrigerant brine and product water from the bottom of condenser section 16 are transferred to the decanter section 15 where liquid refrigerant is removed as overflow and is conducted to the first interchange stage of heat exchanger 17 through line 101 as described above. The refrigerant liquid overflow is in excess of the refrigerant evaporated in the several heat interchanger stages of section 17 and the excess from stage to stage flows concurrently with the sea water through the valved opening 25 and finally into flash chamber 109 from which the cold sea water with residual liquid refrigerant is pumped by pump 110 to the freezer-storage unit 11. The flash chamber 109 generates vapor used in the freezer for sparging as is described in the aforementioned application No. 567,201.

Cold sea water entering freezer vessel 11 is delivered onto trays 51 and 52 from pump 110. Refrigerant vapor is delivered to sparge sections of the freezer from the flash chamber 109 by lines 111. Liquid refrigerant is supplied to the sparge sections from the bottom chamber 53 of the freezer storage unit by refrigerant recycle pump 112. Vaporization of refrigerant removes heat from the sea water on trays 51 and 52 forming ice crystals in brine slurry. A portion of the slurry is withdrawn from the bottom of each U sump 55 and 60 by slurry pumps 113 and 114 respectively. The remaining slurry is recirculated for crystal growth as disclosed in Dunn application Ser. No. 521,777, filed Jan. 20, 1966.

The withdrawn slurry is pumped to washer-melter 12 where it is discharged into the bottom of washer sections 85 of the kind disclosed and claimed in Wiegandt patent application Ser. No. 102,583, filed Apr. 12, 1961 and the continuation thereof, Ser. No. 419,289, filed Dec. 14, 1964, now issued as Patent 3,251,193.

These washer sections 85 are in the form of columns into the lower portion of which the slurry is fed to move upwardly therein. The ice particles in the slurry form into upwardly moving consolidated porous beds in the columns. The liquid brine in the slurry passes into each ice bed in a concurrent direction relative to the upward movement of the bed, moving somewhat faster than the ice, is withdrawn from said column between the walls at a location intermediate the top and bottom of said bed. Wash water from pump 116 is applied to the top of the ice beds, to pass downwardly through the ice bed and thereby wash the ice. The washed ice is cut from the top of the beds, as the beds move upwardly, and falls into the melter compartments 84 which are provided on each side of the washer columns 85. The ice melts by condensation on it of refrigerant vapor from compressor 151 to produce product water. Product water mixed with liquid refrigerant is pumped by pump 117 into the water decanter section 89 through pipe 118. Water is decanted over weir 119 while separated refrigerant is held on the top of the water by baffle 120. Decanted water goes over weir 119 into water storage tank 88 from which it may be pumped by pump 121.

Brine from the washer zone is collected and delivered by line 122 to the brine decanter 86. In brine decanter 86 refrigerant entrained in the brine rises to the top and brine is fed through stand pipe 123 from adjacent the bottom of brine decanter 86 into brine surge tank 87. A vent pipe 124 extends from the brine surge tank through the product water storage and product water decanter to vent near the top of the interior of the housing. Part of the brine from brine surge tank 87 is recycled to the freezer by pump 125, the rest is pumped by pump 126 to the tower 19 for heat exchange, then through the condenser section 16 of vessel 10 as previously described. Product water is pumped by pump 121 to the tower 19 for heat exchange then through the condenser section 16 of vessel 10 as previously described.

Both the brine and the product water leaving condenser section 16 go to primary refrigerant strippers 129, thence to secondary refrigerant strippers 130 before being pumped to discharge by pumps 127 and 128 respectively. Refrigerant vapors from the primary strippers flow through line 131 to the pipe 20 which carries refrigerant vapor from stage compartment S-1 in vessel 10 to condensing stage B-1 in tower 19. Refrigerant vapors from the secondary strippers flow through line 133 to the stripper scrubber 134 where they are countercurrently cooled with cold brine flowing through line 135 from the reject brine pump 126. Vapor from the scrubber 134 flows through line 136 to the debutanizer compressor 132 then to line 131.

The entire system is vented through the vent scrubbing system comprising the vent scrubbers 108a and 108b and vent compressor 137. The mixture of refrigerant vapor and air leaving the condenser section 16 through line 138 enters the low-pressure vent scrubber 108a, where it is scrubbed with cold brine pumped by the low-pressure vent brine pump 139 through line 140 to the top of the scrubber. Vapors vented from scrubber 108 through the pressure controller 141 in line 142 are compressed by vent compressor 137 and flow through line 144 to high-pressure vent scrubber 108b where they are further scrubbed with brine pumped by the high-pressure brine vent pump 145 through line 146. In the high-pressure vent scrubber 108b additional refrigerant vapor is condensed by the cold brine. Inert gas, denuded of refrigerant vapor, is vented to atmosphere through pressure controller 147 in line 148. Refrigerant condensed in the vent scrubbers 108a and 108b returns to condenser section 16 through line 149. By using cold brine rejected from the washer-melter unit in the scrubber 108a, the volume of vent gases is reduced due to the low temperature of the cold brine and the size of the vent compressor required is correspondingly reduced.

Vapor from the primary compressor 151 is delivered by line 153 to the top of the washer-melter 12. Compressed vapor is passed through the ice in the melter sections 84 where most of it condenses in melting the ice. Uncondensed vapor then proceeds through melter-vapor separator 154 into the inlet side of the secondary compressor 107.

The process to which this invention applies has thus far been described for the condition of normal sustained operation, when the pressure in each of the stages in the heat exchange is stable, being sustained by liquid seals in the seal cups of towers 18 and 19 and by restricted flow through the orifices 25 in the passage 21 of vessel 10. These seals are best established by a careful plant start-up procedure. In my earlier application No. 567,201, start-up of the whole process is discussed in some detail. Suffice it to say here that at the outset there is no ice in the system and that ice is made by vaporization of refrigerant in the freezer at a rate limited by the capacity of the secondary compressor 107. During the start-up period, there may be no saline water fed to the saline water cooling section 17 of the heat exchanger through line 160. Instead, saline water is pumped by pump 100 through line 161 directly to condenser section 16 to condense refrigerant vapor from the secondary compressor 107, and the heat exchanger is not in operation. When the system is filled with the required ice, the continuous process is slowly initiated by diverting a small portion of the saline water flow from line 161 to line 160, and simultaneously increasing the flow of liquid refrigerant to the freezer. The saline water flow to the heat exchanger 17 will soon appear as brine and product water flow to the tower 19. If this operation is carefully performed, the seals between heat exchanger stages will be established and the pressure gradient through the heat exchanger section 17 and in the towers 18 and 19 gradually increased to the final equilibrium operating condition. It will be apparent to anyone skilled in the art that the means 26 for controlling flow through the orifices 25 must be properly adjusted, and that the seal cups of the stages in towers 18 and 19 must have enough volume at least to fill the downcomers 85.

I have described my invention without specifying the immiscible vaporizable refrigerant because the invention is not limited to one refrigerant. A preferred refrigerant is normal butane because of all the hydrocarbon refrigerants that may be suitable, such as isobutane, isobutylene, butene-1, butene-2 or their mixtures, it has the least change in vapor pressure with change in temperature, will therefore require the least downcomer height and, consequently, the least height for the towers 18 and 19, as has heretofore been explained.

My invention is not limited to the specific example illustrated by the figures. As already explained, some of the warming of cold product brine can be advantageously carried out in condensing heat transfer stages that are incorporated in the vessel 10, as disclosed and claimed in my application No. 567,201. Any desired portion of the heat transfer to both product brine and product water may be to advantage be carried out with such condenser stages incorporated in vessel 10, these liquids then requiring pumping from stage to stage as is described in the aforesaid application. Likewise, any portion of the heat exchange may be to advantage carried out in conventional indirect surface heat interchangers. The packed contacting zones of the stages in towers 18 and 19 may advantageously be replaced by cascades, or other vapor-liquid contacting means known to the art.

While I have illustrated and described a present preferred embodiment of my invention and its operation, it will be distinctly understood that this invention may be otherwise variously embodied within the scope of the following claims.

I claim:

1. Heat interchange apparatus for saline liquid conversion systems, comprising an elongated tank divided internally by wall members to form intercommunicating stage compartments disposed in an upstream to downstream flow direction, each of said compartments adapted for intimate contact between saline liquid and vaporizing and condensing refrigerant liquid, means communicating with each of said compartments for discharging vaporized refrigerant, at least one elongated upstanding vessel divided internally by plate members into downwardly communicating first cells and downwardly communicating second cells separate from said first cells, first inlet means in an upper portion of said vessel for receiving product brine in the uppermost of said first cells, second inlet means in an upper portion of said vessel for receiving product liquid in the uppermost of said second cells, means connecting one each of said compartments with one each of said first and second cells, respectively, for passing vaporized refrigerant therebetween, and each of said first cells adapted for intimate contact between product brine and condensing refrigerant, each of said second cells adapted for intimate contact between product liquid and condensing refrigerant.

2. Heat interchange apparatus as set forth in claim 1 wherein each of said first cells and said second cells is adapted for concurrent flow with the liquids entering said cells through said first and second inlet means, respectively.

3. Heat interchange apparatus as set forth in claim 1 wherein said connecting means between said compartments and said first and second cells extend in reverse order of progression of said compartments and said cells, beginning with the last downstream one of said compartments to the uppermost ones of said first and second cells and so on to between the first upstream one of said compartments and the lowermost ones of said cells.

4. Heat interchange apparatus as set forth in claim 1 including means between said compartments for controlling the flow rate of saline liquid between adjacent compartments.

5. Heat interchange apparatus as set forth in claim 1 including baffle means in each of said compartments for aiding the mixing of saline liquid and vaporizing refrigerant liquid in such compartment.

6. Heat interchange apparatus as set forth in claim 1 wherein each of said first and second cells have discharge means for discharging inert gases.

7. Heat interchange apparatus as set forth in claim 1 including a plurality of spaced upstanding vessels, each having intercommunicating first and second cells therein, means for pumping product water and product brine, respectively, from a lowermost position of one of said vessels to the upper ones of said first and second cells of the next adjacent of said vessels.

8. Heat interchange apparatus as set forth in claim 1 wherein said first and second cells between respective pairs of connecting means include plate members defining liquid chambers whereby liquid seals are maintained in said vessels between such pairs of connecting means.

9. Heat interchange apparatus as set forth in claim 1 wherein said tank includes a portion adjacent to and communicating with the downstream last one of said stage compartments, said portion having at least one chamber therein being subdivided by two longitudinal walls to form three zones open to each other at the tops thereof, the center zone communicating with the adjacent said stage compartments and adapted for intimate contact between saline liquid and vaporizing refrigerant liquid, the two outer zones adapted for intimate contact between product brine and condensing refrigerant vapor, means for pumping product brine between said outer zones and said vessel through said second inlet means.

10. Heat interchange apparatus as set forth in claim 1 wherein said tank is horizontally disposed and includes a decanting section and a vaporized refrigerant condensing section, said vessel is vertically disposed and includes a pair of reservoir chambers at the lower end portion thereof, each of said reservoir chambers communicating with a lowermost of said first cells and a lowermost of said second cells, respectively.

11. Heat interchange apparatus as set forth in claim 1 wherein said tank is horizontally disposed and includes a portion adjacent to and communicating with the last of said stage compartment, said portion having a plurality of chambers therein each being subdivided by two longitudinal walls to form three zones open to each other at the tops thereof, the center zone communicating with the said stage compartment adjacent said portions and adapted for intimate contact between saline liquid and vaporizing refrigerant liquid, the two outer zones adapted for intimate contact between product brine and condensing refrigerant liquid, means for pumping product brine between said outer zones and said vessel through said second inlet means, wherein said connecting means between said compartments and said first and second cells extend in reverse order of progression of said compartments and said cells beginning with the last downstream one of said compartments to the uppermost ones of said first and second cells, and so on to between the first upstream one of said first compartments to the lowermost ones of said first and said second cells, including means between said stage compartments and between said last downstream stage compartment and said center zones of said chambers for controlling flow rate of saline liquid between adjacent compartments and between said center zones, including baffle means in each of said compartments and said center zones for aiding the mixing of saline liquid and vaporizing refrigerant liquid therein, including a plurality of spaced vertically disposed vessels, each having intercommunicating first and second cells therein, further including means for pumping product water and product brine respectively, from a lowermost portion one of said vessels to the upper ones of said first and second cells of the next adjacent vessel, and wherein said first and second cells between respective pairs of connecting means include plate members defining liquid chambers whereby liquid seals are maintained in said vessels between such pairs of connecting means.

12. Heat interchange apparatus as set forth in claim 1 wherein said tank is horizontally disposed and includes a decanting section and a vaporized refrigerant condensing section, said connecting means between said compartments and said first and second cells extend in reverse order of the progression of said compartments and said cells between with the last downstream one of said compartments to the uppermost ones of said first and second cells, and so on to between the first upstream one of said compartments to the lowermost ones of said first and second cells, including means between said stage compartments for controlling flow rate of saline liquid between adjacent compartments, including baffle means in each of said compartments for aiding the mixing of saline liquid and vaporized refrigerant liquid in said compartments, including a plurality of spaced vertically disposed vessels having intercommunicating first and second cells therein, further including means for pumping product water and product brine, respectively, from a lowermost portion of one of said vessels to the upper ones of said first and second cells of the next adjacent vessel, wherein said first and second cells have discharge means for discharging inert gases, said connecting means is arranged to pass vaporized refrigerant between said compartments and said first and second cells in a concurrent flow direction to the liquids entering said cells through said first and second inlet means, and wherein said first and second cells between respective pairs of connecting means include plate members defining liquid chambers whereby liquid seals are maintained in said vessels between such pairs of connecting means.

References Cited

UNITED STATES PATENTS 3,229,479   1/1966   Weller _____ 165—161 X
3,304,734   2/1967   Dunn _____ 62—123

WILLIAM E. WAYNER, Primary Examiner

U.S. Cl. X.R.

62—58; 165—161